UNITED STATES PATENT OFFICE.

FREDERIC LEWIS NATHAN, WILLIAM RINTOUL, AND FRANK BAKER, OF STEVENSTON, SCOTLAND, ASSIGNORS TO E. I. DU PONT DE NEMOURS POWDER COMPANY, OF WILMINGTON, DELAWARE, A CORPORATION OF NEW JERSEY.

EXPLOSIVE.

1,090,644.  Specification of Letters Patent.  Patented Mar. 17, 1914.

No Drawing.  Application filed June 4, 1913. Serial No. 771,623.

*To all whom it may concern:*

Be it known that we, FREDERIC LEWIS NATHAN, manager, WILLIAM RINTOUL, chief chemist, and FRANK BAKER, chemist, all of Ardeer Factory, Stevenston, in the county of Ayr, Scotland, have invented a certain new and useful Improvement in and Relating to Explosives, and do hereby declare that the following is a full, clear, and exact description thereof.

This invention relates to stabilizing of propellant explosives.

However carefully prepared, nitric esters, such as nitrocellulose, nitroglycerin, nitromannite and nitrostarch, undergo a slow decomposition even at ordinary temperatures, with the result that these substances and mixtures containing one or more of them, are liable to deteriorate when kept for considerable periods. The products of the decomposition referred to, if allowed to remain in contact with the unchanged esters, exert an accelerating effect on the decomposition. Especially is this the case with explosives containing one or more members of the above-mentioned class of chemical compounds, and such explosives are liable to become not merely unserviceable but dangerous. It is therefore essential, in order to obtain an explosive of good chemical stability, that, besides being prepared from thoroughly stabilized materials it shall have added to it some substance which will have the effect of removing from it or rendering innocuous these products of decomposition.

It is already known that vaseline or mineral jelly exerts a stabilizing action on explosives into which it is introduced. It, however, possesses certain disadvantages which limit the stabilizing effects produced by it. For instance, it is an exceedingly complex substance, some of the components of it being very much less active in their stabilizing properties than others. It is, moreover, entirely insoluble in nitroglycerin. These properties tend to produce a want of homogeneity in the explosive, and ultimately to limit the stabilizing effects of this substance. We have discovered that certain other substances possess to a very high degree the power of absorbing the harmful products of decomposition, and thus of rendering more stable nitric esters or mixtures containing them, to which they are added. These substances are chemical compounds of the class $NH_2$—$CO.OR$, where R is an alkyl or aromatic radical, and where one or both of the hydrogen atoms of the $NH_2$ group is or are replaced by a radical which, as in the case of R, may be alkyl or aromatic provided that the compound contains at least one aromatic radical such as phenyl, naphthyl or phanthryl whether at R or in substitution for either of the hydrogen atoms of the $NH_2$ group. These substances are known as esters of substituted carbamic acids.

This invention consists therefore broadly in effecting stabilization of propellant explosives formed of or containing a nitric ester by including therein one or more of these substances in suitable quantity.

Compounds as referred to can be prepared by acting on esters of chloroformic acid with primary or secondary aromatic amins. Thus ethyl chloroformic ester and anilin give phenyl urethane.

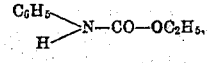

or the ethyl ester of phenyl-carbamic acid, while methyl anilin and ethyl chloroformic ester give methyl-phenyl-urethane

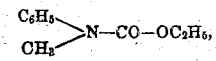

or the ethyl ester of methyl-phenyl-carbamic acid.

Other substances belonging to this class of compounds can be prepared by the action of the alkali salts of phenols on urea chlorids. For example, sodium phenate in alcoholic solution is added to diphenylurea-chlorid also in solution in alcohol, sodium chlorid separates out, while the phenyl ester of diphenyl-carbamic acid remains in solution and can readily be separated. This reaction is represented by the following equation—

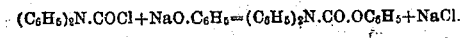

Yet another method of preparation of certain of these substances consists in acting on aromatic isocyanates with alcohols or phenols. For example, phenyl isocyanate and phenol when heated with a small quantity of aluminium chlorid yield the phenyl ester of phenyl carbamic acid, thus:

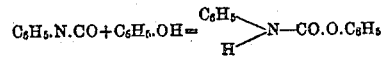

These bodies are of course only examples of the class of bodies referred to.

In judging which substance or substances of the class is or are most suitable for use in any particular case, we are guided by the properties of the individual compounds, such as volatility, solubility in nitroglycerin, and the readiness with which they become nitrated. As these substances are introduced into explosives with the view of absorbing the products of decomposition by becoming nitrated, their higher nitro derivatives are unsuitable for this purpose because of the increasing difficulty with which nitration occurs as the degree of nitration rises.

As an example of the use, according to our present invention of one of the above class of compounds, an explosive of the following composition may be cited:—

| | |
|---|---|
| Nitroglycerin | 30% |
| Guncotton | 65% |
| Methyl-phenyl-urethane | 5% |

These substances possess the property of combining or reacting with the decomposition product of nitric esters and thus preventing them from having any accelerating influence on the decomposition of these esters. The action of any of these substances, when introduced as a stabilizer into nitric esters or mixtures of them, consists apparently partly in their becoming nitrated by the nitrogen peroxid and other injurious decomposition products of the nitric esters, and partly in their reducing these acid bodies to compounds which have no action on the nitric esters. A further advantage which some of these urethane derivatives possess over mineral jelly and similar previously proposed substances is that of being sufficiently soluble in nitroglycerin. When bodies which are insoluble or only slightly soluble in nitroglycerin are added to a nitroglycerin explosive they often exhibit a tendency to separate out from the finished explosive either in the form of crystals or as an oil. Any separation of this nature is exceedingly disadvantageous for many reasons. The fact that some of these urethane derivatives are soluble in nitroglycerin is also important from another point of view, namely, that it tends to the production of a more homogeneous mixture and to the increase of the active mass of the stabilizer present.

We are aware that similar compounds have been used in connection with pyroxylin which we do not claim herein.

We claim:—

1. An explosive containing at least one highly nitrated nitric ester and an ester of a substituted carbamic acid containing at least one aromatic radical.

2. An explosive containing at least one nitric ester and an ester of a substituted carbamic acid containing an alkyl, and an aromatic radical in substitution respectively for the hydrogen atoms of the amino group.

3. An explosive containing nitrocellulose, nitroglycerin and methyl phenyl urethane.

4. An explosive containing, gelatinized together, nitrocellulose, nitroglycerin and an ester of a substituted carbamic acid containing at least one aromatic radical.

5. An explosive containing gelatinized together, nitrocellulose, nitroglycerin and an ester of a substituted carbamic acid containing an alkyl and an aromatic radical in substitution respectively for the hydrogen atoms of the amino group.

6. An explosive containing, gelatinized together, at least one highly nitrated nitric ester and an ester of a substituted carbamic acid containing at least one aromatic radical.

7. An explosive containing, gelatinized together, at least one nitric ester and an ester of a substituted carbamic acid containing an alkyl, and an aromatic radical in substitution respectively for the hydrogen atoms of the amino group.

8. An explosive containing, gelatinized together, nitrocellulose, nitroglycerin and methyl phenyl urethane.

In testimony that we claim the foregoing we have hereunto set our hands.

FREDERIC LEWIS NATHAN.
WILLIAM RINTOUL.
FRANK BAKER.

Witnesses:
M. B. MILNE,
ERNEST HANSFORD.